United States Patent [19]

Mitani et al.

[11] E Re. 29,276

[45] Reissued June 21, 1977

[54] LENS ATTACHMENT FOR FLASH-LIGHT PHOTOGRAPHING

[75] Inventors: Taizo Mitani; Takayuki Shirashaki, both of Yokohama, Japan

[73] Assignee: Canon Kabushiki Kaisha, Tokyo, Japan

[22] Filed: June 9, 1975

[21] Appl. No.: 584,840

Related U.S. Patent Documents

Reissue of:

[64] Patent No.: 3,738,240
Issued: June 12, 1973
Appl. No.: 184,351
Filed: Sept. 28, 1971

[30] Foreign Application Priority Data

Oct. 2, 1970 Japan ..... 45-86939

[52] U.S. Cl. ..... 354/32; 354/43; 354/46; 354/149; 354/297

[51] Int. Cl.[2] ..... G03B 7/16; G03B 7/20; G03D 13/00

[58] Field of Search ..... 354/32, 35, 38, 40, 354/43, 46, 60 R, 126, 149, 295

[56] References Cited

UNITED STATES PATENTS

| | | | |
|---|---|---|---|
| 3,504,602 | 4/1970 | Kiper et al. | 354/35 |
| 3,505,938 | 4/1970 | Zobel et al. | 354/60 X |
| 3,779,142 | 12/1973 | Yata et al. | 354/32 X |

FOREIGN PATENTS OR APPLICATIONS

| | | | |
|---|---|---|---|
| 1,509,742 | 1/1968 | France | 354/40 |
| 4,735,026 | 9/1972 | Japan | 354/149 |

*Primary Examiner*—L. T. Hix
*Assistant Examiner*—J. A. LaBarre
*Attorney, Agent, or Firm*—Toren, McGeady and Stanger

[57] ABSTRACT

In an automatic flash camera having a lens with a rotatable focusing ring, a lens attachment coacts with the focusing ring to control the camera. In the attachment, a mounting arrangement detachably mounts the attachment to the end of the lens. An interconnecting arrangement, rotatably mounted on the mounting arrangement, engages the focusing ring to move therewith. A variable resistance system is mounted on the two arrangements and is varied by movement of the interconnecting arrangement relative to the mounting arrangement. The variable resistance system includes an adjustable member which is movable between a number of positions. In one position the variable resistance system exhibits one range of resistances corresponding to one type of lens when the interconnecting arrangement is moved. In other positions the variable resistance system exhibits other ranges of resistances each corresponding to lenses of other aperture ratios and focal lengths. An electrical system connected to the variable resistance system responds to the value of the resistance exhibited and controls the diaphragm of the camera for automatic flashlight photography.

25 Claims, 9 Drawing Figures

INVENTORS
TAIZO MITANI
TAKAYUKI SHIRASHAKI

BY Toren and McKeady
ATTORNEY

INVENTOR
TAIZO MITANI
TAKAYUKI SHIRASHAKI

BY Toren and McKeady
ATTORNEY

INVENTOR
TAIZO MITANI
TAKAYUKI SHIRASHAKI

BY Toren and McGeady
ATTORNEY

INVENTOR
TAIZO MITANI
TAKAYUKI SHIRASHAKI

BY Taren and McHeady
ATTORNEY

LENS ATTACHMENT FOR FLASH-LIGHT PHOTOGRAPHING

Matter enclosed in heavy brackets [ ] appears in the original patent but forms no part of this reissue specification; matter printed in italics indicates the additions made by reissue.

The present invention relates to a lens attachment for flash-light photographing, and particularly, a lens attachment for flash-light photographing, which is additionally fitted to a photographic lens for automatic flash-light photographing.

In case of flash-light photographing, such an auxiliary light means as a flash bulb, a strobo lamp or the like is made flash synchronously with the operation of a camera shutter to illuminate the object to be snapped, so that a good exposure can be obtained even for the dark object to be snapped in flash-light photographing. In such case of flash-light photograhing, the quantity of light to be obtained by flashing of such as a strobo bulb, used for an auxiliary illumination light, namely the guide number has various values, so that each time of photographing it becomes necessary on the camera side to calculate the number GN and the distance D to the object to be snapped in order to get the diaphragm $F = GN/D$.

It is very troublesome to calculate as above each time a photograph is taken. Therefore, as a method to get rid of this defect, it has hitherto been suggested that as shown in for example U.S. Pat. Nos. 3,074,331, 3,128,168, 3,134,315, 3,169,464, 3,198,096, 3,102,461, BP 920,826, U.S. Pat. Nos. 3,084,605, 3,087,397, BP 984,435, DP 1,170,774, FP 1,340,577, U.S. Pat. No. 3,075,442, DP 1,173,334, a mechanical calculation mechanism is equipped inside a camera or a lens tube and is so constructed as to figure out the diaphragm value or the distance value for a good exposure when the distance or the diaphragm is adjusted by adjustment of the guide number. It is well-known as another suggestion to be enumerated that as shown in for example Japanese Patent Publication No. Sho-3-9-20275 and German Pat. No. 1,927,498, the movable slider of a variable resistor, set in the lens, is made variable in interlocking with the distance ring of a photographic lens for a camera, so that the calculation is electrically performed by the electric resistance of said resistor; the result of the calculation being indicated by the swing of the indicator of a meter to get the diaphragm value for a good exposure.

According to all of the above-mentioned prior arts, the combination of distance and diaphragm values is calculated and adjusted from the guide number of an auxiliary light in a special camera or lens, equipped with a calculation mechanism in the camera or the lens tube. Therefore, the camera or lens has been so constructed as to be used for a special machine.

However, in order to equip such a calculation mechanism in a popular camera, it is necessary to remodel the camera or lens essentially. It was substantially impossible to equip such a calculation mechanism in a lens built-in type camera. In case of a camera, in which a lens tube and a camera body can be separated and interchangeable lenses, having various kinds of open diaphragm values are used, it is impossible to make it able to take a flash-light photograph with any of the interchangeable lenses. The reason is that it is impossible to calculate exactly at the time of the automatic flash-light photographing, if the open diaphragm values are not set the calculation mechanism for every kind of interchangeable lenses. There is such a defect that even if the calculation mechanism is fitted to the camera body to receive an open diaphragm value signal from the side of the interchangeable lens to be used, it is necessary to remodel both sides of the camera and the lens drastically.

In case of a single-lens reflex camera, having interchangeable lenses used, when the distance ring of the interchangeable lens is adjusted, a range information is not transmitted as a mechanical displacement to the side of the camera body. Therefore, if the calculation mechanism is contained only on the side of the camera body and the side of the interchangeable lens is not remodelled, it cannot serve for the automatic flash-light photographing. Both the camera and the lens must be substantially remodelled.

As above-mentioned, it is necessary for an existing camera to remodel the camera and/or the lens substantially in order to take an automatic flash-light photograph. But such a remodelling is essentially impossible. Therefore, a camera or lens must be specially constructed for automatic flash-light photographing.

It is the object of the present invention to eliminate the above-mentioned conventional defect and to provide a lens attachment, which is fitted additionally to the end of a lens so that it becomes able to take an automatic flash-light photograph.

Another object of the present invention is to provide a lens attachment for automatic flash-light photographing, comprising that a variable resistor is set in the attachment, fitted additionally to the end of the lens and said resistor is made variable in interlocking with the adjustment of the distance ring of the lens, so that the resistance value of said resistor can be caught as a range information.

The other objects of the present invention may be made clear from the detailed description of embodiments of the present invention in reference to the attached drawings.

FIG. 1 is a perspective general view of a camera, when a lens attachment according to the present invention is fitted to an interchangeable lens type single-lens reflex camera;

FIG. 2, a perspective front view of a lens attachment;

FIG. 3, a perspective rear view of a lens attachment;

FIG. 4, a cross section view of the lens attachment, shown in FIGS. 1 and 2;

FIG. 5, a partly sectional view of the lens attachment, shown in FIG. 3;

FIG. 6, a schematic view of the main part of a lens attachment according to the present invention;

FIGS. 7 and 8, respectively a side view and a front view of the main part of a lens tube, fitted with a lens attachment according to the present invention; and FIG. 9, an assembly drawing for the main part of a lens attachment according to the present invention.

DESCRIPTION OF EMBODIMENT

Figure 1:
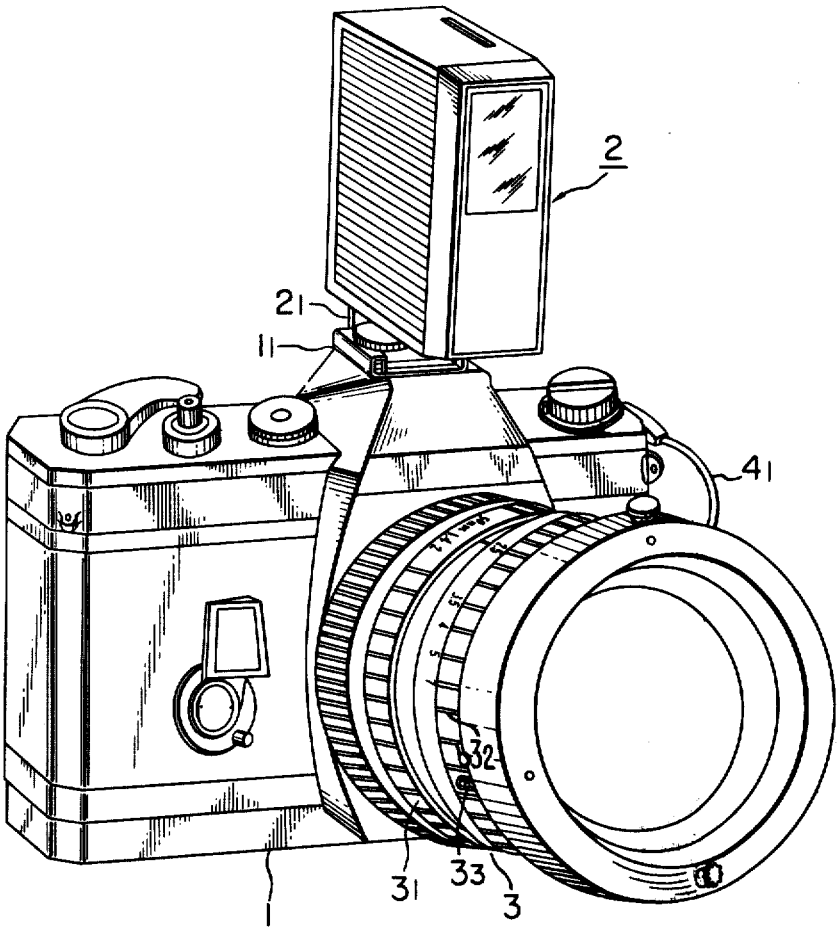

In FIG. 1, 1 is a single-lens reflex camera body; 2, a strobo, equipped to the accessary shoe, which is attached to the camera body 1; 3 an interchangeable lens, attached to the camera body 1; $3_1$, a diaphragm adjustment ring, equipped on the lens 3; $3_2$, a range adjustment ring, equipped on the lens 3; 4, and attachment for automatic flash-light photographing; and $4_1$, a lead connection of the attachment and connected with an outer terminal on the side of the camera body 1. The strobo 2 is so constructed that when the strobo 2 is fixed to the shoe 1, of the camera, the leg 2, of the strobo is electrically connected with the connecting terminal for a synchrocontact, equipped on the shoe $1_1$.

When the lens attachment 4 according to the present invention is not fitted, the camera 1 is fitted a with the lens 3 and the strobo 2 to perform common strobo auxiliary light photographing. In this case, it is necessary to figure out the diaphragm value from the guide number of the strobo 2 and the distance, indicated by the distance ring $3_2$ of the lens 3. It is impossible to take the so called automatic flash-light photograph. If the attachment 4 is fitted to the end of the lens 3, it becomes possible to take an automatic flash-light photograph as described here-in-after.

Figure 2:
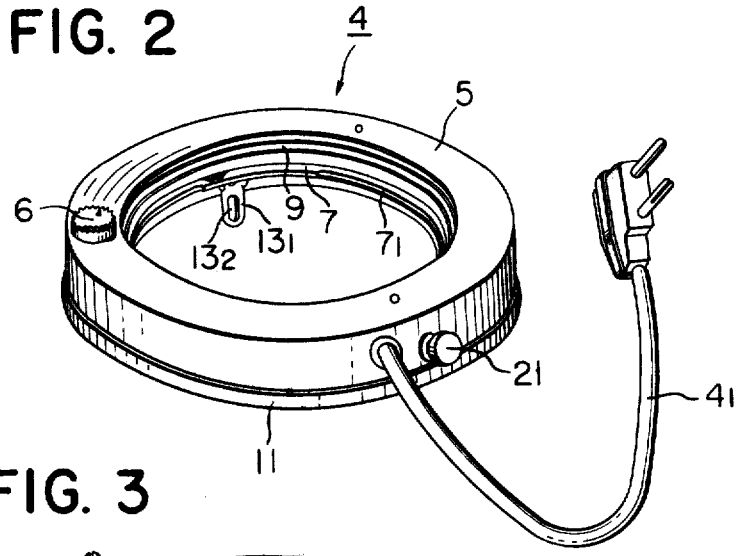
Figure 3:
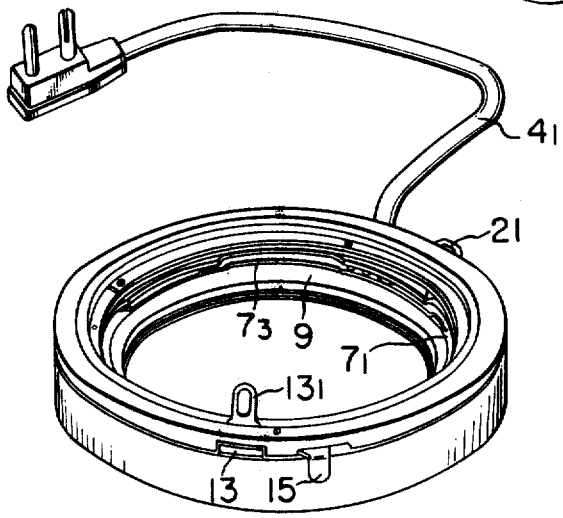
Figure 4:
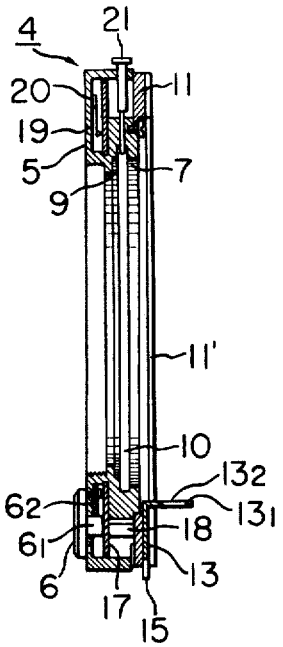
Figure 5:
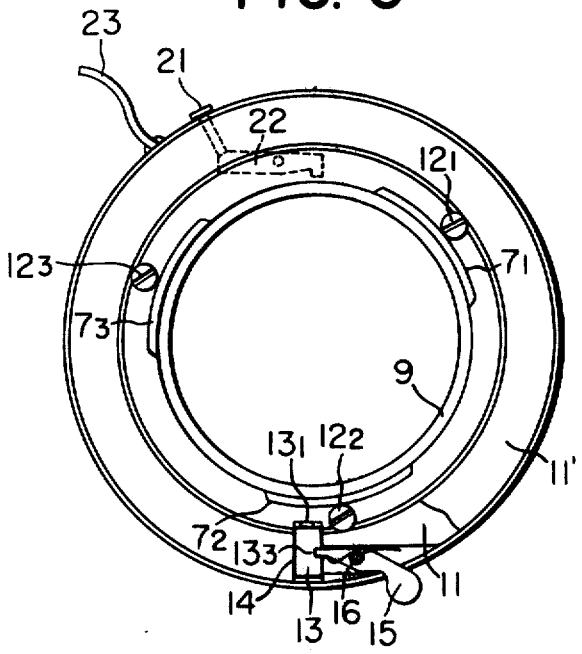

The attachment 4 is shown in the detail in FIGS. 2 to 5. In each drawing, 5 is an attachment case, constructed in a channel shape and also made so circular as to surround the end part of the lens tube, which will be explained below. 6 is a thumb nut, pivoted with a shaft 6, rotatably on the front face of the case 5 for adjusting the open diaphragm value of the lens; and $6_2$, a movable contact, fixed to the shaft $6_1$. The diaphragm adjustment thumb nut 6 is, as shown in FIG. 2, so turned as to make the index correspond to each index diaphragm indication in order to be available for various lenses, having different open aperture values. It is loosely fixed by a click mechanism (not shown in the drawing). 7 is a bayonet plate, composed in one piece with the case 5 and having notched portions $7_1$, $7_2$ and $7_3$ to be inserted with bayonet claws as shown in FIG. 5. 9 is a confronting holder, made in one piece with the case 1 and confronting the bayonet plate with a stepped portion, to leave a space 10 against said plate 7, so that the bayonet claws on the lens side are inserted into the space to be held. 11 is a rotary plate, made so circular as to cover the rear opening part of the case 5 and having the peripheral edge held rotatably by fixing screws $12_1$, $12_2$ and $12_3$ on the bayonet plate 7. 11′ is a covering plate for the rotary plate 11. 13 is a distance ring holding member, inserted in a concave groove 14 of the rotary plate 11 and held slidably in the direction of the optical axis. It is bent in a L shape as shown in FIG. 4 and has a slot $13_2$ made on its bent part $13_1$. The longitudinal length of the slot $13_2$ should be such a sufficient length that when the pin of the distance ring of the lens is inserted in said slots as mentioned hereinafter, the pin is removed in the direction of the optical axis according to the degree of the lens to be drawn out, but the pin can freely move in said slot $13_2$ with a sufficient clearance.

Figure 6:
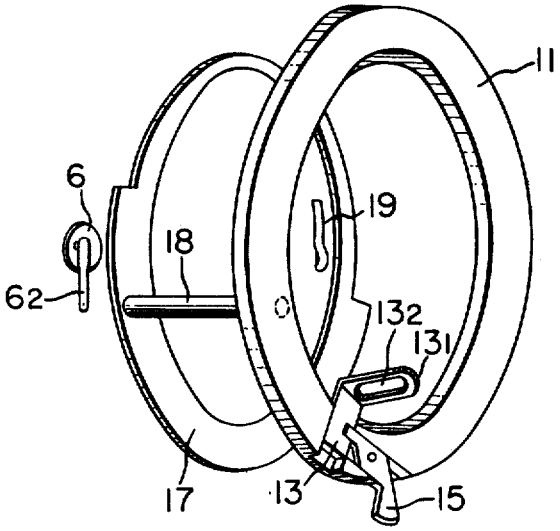
Figure 9:
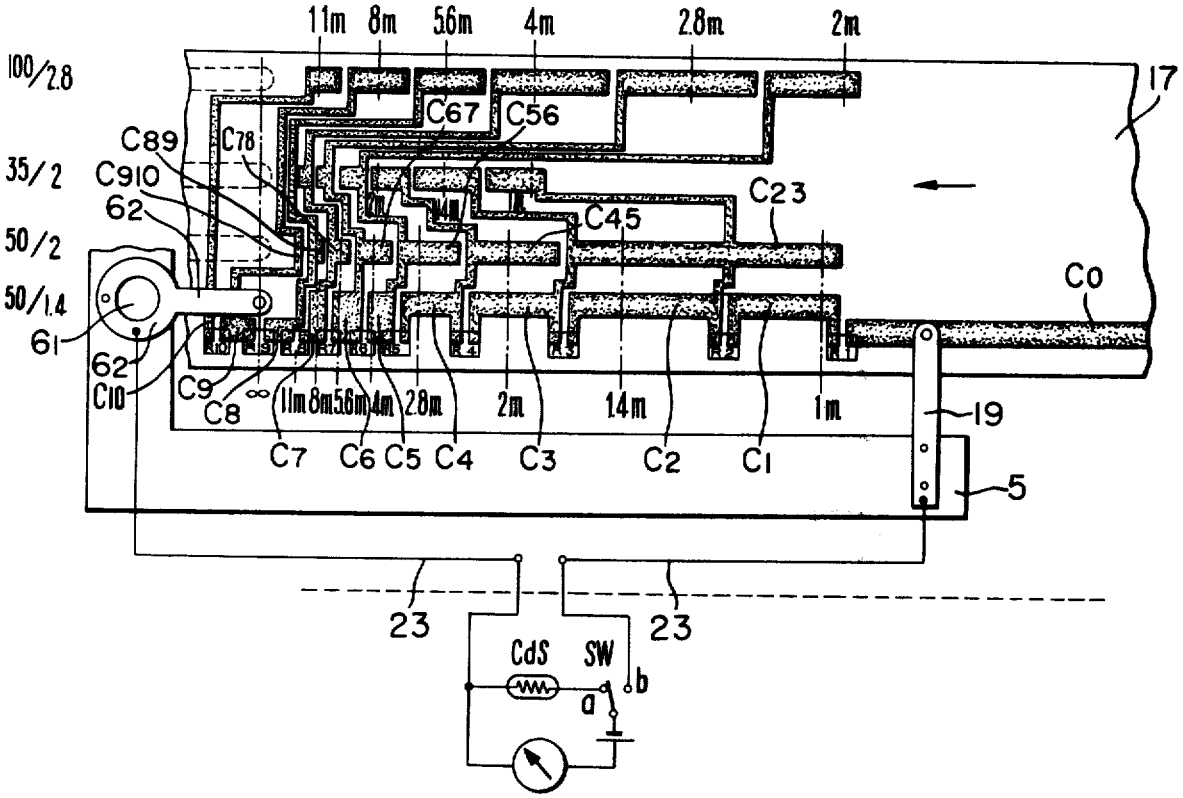

15 is a check lever, having the end porition engaged with a notched groove $13_3$, made on the side of the holding member 13 and besides, pivoted with a pivot journal 16, fixed to the rotary plate 11. When the attachment 4 is fitted to the lens tube, the interlocking pin on the distance ring of the lens may be made to change in height, but the pin can be engaged or disengaged by this lever. 17 is a printed plate, contained in the case 5 and connected with the rotary plate 11 in interlocking with an interlocking pin 18 as shown in FIG. 6. 19 is a stationary contact, fixed through an isolated base plate 20 to the inside of the case 5 and always pressed to the printed plate 17. As shown in the development of FIG. 9, the printed plate 17 is provided with fixed resistors $R_1$ to $R_{10}$, firmly arranged in its circumferential portion. Conductors $C_1$ to $C_{10}$ are printed in wiring for connecting the respective resistors successively in series with the adjoining.

Figure 7:
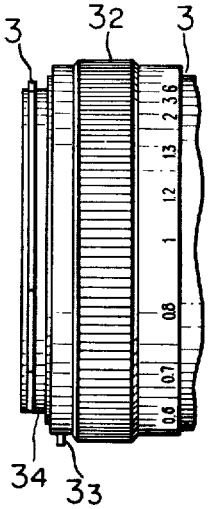
Figure 8:
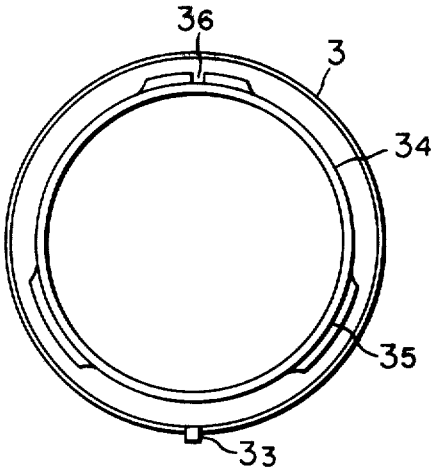

Further, the conductors $C_{23}$, $C_{45}$, $C_{56}$, $C_{67}$, $C_{78}$, $C_{89}$ and $C_{910}$ are printed in wiring in parallel to the respective conductors $C_2$ to $C_9$ with the one-step displacement in a radial direction. Each conductor is step-wise displaced in a radial direction in parallel to the conductors $C_3$ to $C_{10}$, so that a conductive part is formed with a successive lag. By the rotation of the beforementioned open diaphragm value adjustment thumb nut 6, the index is made to correspond to the diaphragm value index, stamped on the outer surface of the case 5. Then, the movable contact $6_2$ is removed by means of the shaft 6, to the position, shown with a dotted line in FIG. 9, so that the position of the contact $6_2$ is adjusted corresponding to the open diaphragm value of the lens. A fixed resistor, having an almost similar resistance value is available for the respective resistors $R_1$ to $R_{10}$. 21 is a clamp releasing lever, protruded from the case 5 to be operated from outside and pressing a clamp lever 22. 23 is a signal transmission cable, connected with the sliders $6_2$ and 19. FIGS. 7 and 8 are schematic views of the end portion of a lens tube which is applied with an attachment 4, having the abovementioned construction. In the drawings, [32] $3_2$ is a distance ring for adjustment of the range of a lens tube; [33] $3_3$, an interlocking pin, attached to the distance ring [32] $3_2$; and [34] $3_4$, an adaptor fixture, attached to the end of the lens tube and having a three-clawed bayonet part [35] $3_5$. When the distance ring 1 is turned in the direction of an arrow to adjust the range from the infinite distance of the object to be snapped towards the near distance, the adaptor fixture juts straight out in the axial direction of the distance ring 1. [36] $3_6$ is a clamp grove, made in the bayonet part [35] $3_5$.

The case that an attachment, constructed as above for automatic flash-light photographing, is fitted to a camera to take an automatic flash-light photograph, shall be explained as an example, as follows;

First, the bayonet $3_5$ is inserted in the bayonet receiving grooves $7_1$ to $7_3$ as the check lever 15 on the rotary plate 11 being pushed. The attachment 4 is turned at a precribed angle to be mounted on the universal lens tube, having the interlocking pin [33] $3_3$ in the distance ring [32] $3_2$. The lens tube 3 and the attachment 4 are firmly fixed by the respective bayonet parts 35 and 7, and clamp 22 and the clamp groove 36, and a spring (not shown in the drawing), which acts on the clamp 22. Next, the check lever 15 is pushed to release the L-shaped member 13 in a diametrical direction from the engagement with the interlocking pin 33. In this condition, the interlocking pin [33] $3_3$ of the distance ring [32] $3_2$ is fitted to the long groove $13_2$ of the L-shaped member 13, and the check lever 15 is released from pushing. Then, the L-shaped member 15 is restored to be engaged with the interlocking pin $3_2$, because the spring is acting to the check lever 15. Thus, the distance ring $3_2$ of the lens tube is interlocked with the rotary plate 11 of the adaptor. The click operation of the open diaphragm value adjustment thumb nut 6 can be selectively applied to several kinds of lenses, having a different focal distance and open diaphragm value. Therefore, it is set to the lens tube 3, interlocking with the attachment 4. Finally, the cord 23, having two terminals of a movable contact $6_2$ and a contact brush 19, is connected in parallel with CdS of the exposure control circuit 21 of the camera through a change-over switch Sw. In order to equip the attachment 4, the body of the attachment 4 is turned at a certain angle, as the clamp push button 21 and the check lever 15 being pushed.

In case of flash-light photographing, the switch SW is changed over from the contact a of the exposure meter circuit to the contact b of the flash circuit (FIG. 5). Then, the guide number is set and the distance ring 1 of the tube is operated. When the range is adjusted to the object to be snapped, the printed plate 17 is rotated by the rotary plate 11 and the fixing pin 18. The resistance value inside the attachment is made to change corresponding to the distance. The diaphragm value is automatically calculated. In the needle-type camera, the needle is set to the diaphragm control device of the lens tube, so that the iris aperture is determined, while in the EE camera, the iris aperture is determined at the same time when the diaphragm value is calculated by the EE mechanism. *The ammeter and the diaphragm control device may be referred to as electrical means, and the CdS element as a photometric element. Together these form part of what is referred to as diaphragm control means.*

When light is measured in a camera of the so-called TTL open exposure measuring system, attached with a kind of lens, having different open F numbers, the ammeter deflects at a different angle, as a result of the difference of the passing quantity of light, even though the same object is snapped. Accordingly, in this type of camera, the ammeter is turned (absolute value signal type) or the diaphragm index of the finder is moved (system of open F numbers being evenly arranged) by a mechanical or manual operation for compensation. *The term correcting means is applied hereafter to the apparatus performing this compensation. The correcting means in combination with the diaphragm control device can be referred to as operating means.* It is necessary to change over exactly for the above-mentioned compensation on the camera side in case of flash-light photographing, because the diaphragm value for the distance from the object to be snapped must be always same without regard to the open F number of the lens.

In the apparatus according to the present invention, the change-over effect is obtained for the difference of the open F number of the lens, by that the conductors ($C_1$ to $C_{10}$) and ($C_{23}$ to $C_{910}$) are placed on the printed plate 17 with a lag for a series of resistance values according to the distance from the object to be snapped. For example, as shown in FIG. 9, the F 2 lens has a larger resistance value by one step at the same distance of 2 m from the object to be snapped, as compared with the [F 1,4] *F 1.4* lens, having the same focal distance. The resistance value corresponds to that of the camera, having a [F 1,4] *F 1.4* lens, at the distance of 2.8 m from the object to be snapped. Similarly, the resistance value of a F 2.8 lens, having another focal distance, is large by two steps and corresponds to that of a F 1.4 lens at the distance of 4 m.

As the present invention is composed as above, flash interlocking or automatic flash photographing can be performed for a plurality of cameras, having the same indication current value of an exposure meter, in combination of a plurality of lens, having different focal distance and open diaphragm values. The simplification and automation of flash photographing as well as the enlargement of a flash photographic range are also resulted very conveniently. *The members 19 and 17 are a part of what may be referred to as information setting means while the term selector means may be used to refer to the switch SW. The members $C_{10}$ to $C_{89}$ and the member $6_2$ may be referred to as removing means, defeat means, and recorrecting means. However, the various "means" terms before and hereafter are not limited to the particular element mentioned. The members 19, $C_0$ to $C_{89}$, and $6_2$ may be referred to collectively as resistance varying means. The members $3_2$, $3_1$, and the (unnumbered) shutter time setter may be collectively referred to as data entering means, while the term sensing means may include the element CdS. The term coupling or connector or interconnecting means may be used to include the member $13_2$, and the bayonet plate 7 may be referred to as mounting means.*

What is claimed:

1. For an automatic flash camera having an automatic diaphragm control and a photograhic lens with a rotatable focusing ring, a lens attachment, comprising mounting means for detachably mounting the attachment at the end of the lens, interconnecting means rotatably mounted on said mounting means and engageable with the focusing ring, variable resistance means mounted on said mounting means and said interconnecting means, said resistance means being variable by movement of said interconnecting means with the focusing ring and having an adjustable member which is movable between a plurality of positions, said variable resistance means exhibiting one range of resistances corresponding to one type of lens when the member is in one position and the interconnecting means is moved relative to the mounting means through a given path, said variable resistance means exhibiting another range of resistances corresponding to another type of lens when the member is in another position and the interconnecting means is moved relative to the mounting means through a path corresponding to the one path, electrical means connected with said variable resistance means and coupled to said diaphragm control means for adjusting the diaphragm on the basis of an electrical resistance value based upon the rotation of the focusing ring and the position of said member, said member being adjustable to a position causing said resistance means to exhibit a range of values corresponding to the type of lens.

2. An attachment as in claim 1, wherein said variable resistance means includes a plurality of conductive contact means extending along a plurality of separate paths and mounted on one of said interconnecting means and said mounting means, said resistance means further including a slider mounted on the other of said mounting means and said interconnecting means and contacting one of said contact means on the basis of the position of said member and movable along one of the paths when said interconnecting means moves with respect to said mounting means and varying the resistance exhibited by said resistance means on the basis of the type of lens being used and the position of the focusing ring.

3. An attachment as in claim 1, wherein said variable resistance means extends along a circular path.

4. A system as in claim 2, wherein said resistor means extend along circular paths.

5. An attachment as in claim 2, wherein each of said contact means comprises an insulating base plate, a plurality of contact strips extending along the path, said strips being separated from each other, a plurality of resistances connected between said contact strips, the location of said contact strips causing said slider to be connected to different ones of said resistances depending upon the position of said member and the focusing of said ring, and wiring means connecting said resistance means to said circuit means.

6. A camera, comprising a camera body, an interchangeable lens, an adjustable focusing ring on the lens, mounting means for detachably mounting the attachment at the end of the lens, interconnecting means rotatably mounted on said mounting means and engageable with the focusing ring, variable resistance means mounted on said mounting means and said interconnecting means, said resistance means being variable by movement of said interconnecting means with the focusing ring and having an adjustable member which is movable between a plurality of positions, said variable resistance means exhibiting one range of resistances corresponding to one type of lens with the members in one position and the interconnecting means is moved relative to the mounting means, said variable resistance means exhibiting another range of resistances corresponding to another type of lens when the member is in another position and the interconnecting means is moved relative to the mounting means, electrical means connected with said variable resistance means and coupled to said diaphragm control means for adjusting the diaphragm on the basis of an electrical resistance value based upon the rotation of the focusing ring and the position of said member, said member being adjustable to a position cause said resistance means to exhibit a range of values corresponding to the type of lens.

7. A camera as in claim 6, wherein said variable resistance means includes a plurality of conductive contact means extending along a plurality of separate paths and mounted on one of said interconnecting means and said mounting means, said resistance means further including a slider mounted on the other of said mounting means and said interconnecting means and contacting one of said contact means on the basis of the position of said member and movable along one of the paths when said interconnecting means moves with respect to said mounting means so as to vary the resistance exhibited by said resistance means on the basis of the type of lens being used and the position of the focusing ring.

8. A camera as in claim 6, wherein said variable resistance means extends along a circular path.

9. A system as in claim 7, wherein said resistor means extend along circular paths.

10. A camera as in claim 7, wherein each of said resistor means comprises an insulating base plate, a plurality of contact strips extending along the path, said strips being separated from each other, a plurality of resistances connected between said contact strips, the location of said contact strips causing said slider to be connected to different ones of said resistances depending upon the position of said member and the focusing of said ring, and wiring means connecting said resistance means to said electrical means.

*11. For a single lens reflex camera having an interchangeable lens with a maximum diaphragm aperture, diaphragm control means including electrical means and a photometric element coupleable to said electrical means for receiving light passing through the maximum aperture of the interchangeable lens, and correcting means for correcting variations in the measurements of the photometric element as a result of the particular maximum aperture of the interchangeable lens, an automatic flash control device comprising:*

*information setting means connectable to the diaphragm control means for setting information for flash photography,*

*selector means for connecting said electrical means to one of the photometric elements and the information setting means in dependence upon whether the flash is to be used, and*

*removing means in said setting means for substantially removing the correction of the correcting means.*

*12. An apparatus as in claim 11, wherein said setting means forms a part of an attachment removably mounted on said interchangeable lens, said setting means including variable resistance means connectable to said electrical means, said resistance means exhibiting an output resistance and having first resistance varying means for varying the resistance on the basis of manually entered flash information and second varying means for varying the resistance on the basis of the maximum aperture of the lens.*

*13. An automatic flash device for a single lens reflex camera having an interchangeable lens, a diaphragm control means including electrical means connectable to a photometric element which receives light passing through the full-opened diaphragm of the interchangeable lens, and a means for correcting errors in the photometry corresponding to the open diaphragm value of the interchangeable lens, said automatic flash photographing means comprising:*

*setting means connectable to the diaphragm control means for setting information for the flash photography*

*selector means for changing and connecting the photometric element and the information setting means to the electrical means in correspondence to daylight photography and flash photography, and*

*means for substantially removing the correction corresponding to the open diaphragm value of the interchange lens for the flash photography.*

*14. The device according to claim 13 wherein said setting means form part of an attachment removably mounted on one end of the interchangeable lens, said attachment comprising a variable resistance means for setting the flash photography information, connectable to the electrical means and varying means for changing the correction made according to the open diaphragm value of the interchange lens correctly for performing a flash operation.*

*15. The device according to claim 14 in which the varying means includes a variable resistance and a contact means.*

*16. The device according to claim 13 in which the electrical means includes an ammeter, and the correction means rotates the ammeter in correspondence to the open diaphragm value of the interchangeable lens.*

*17. An automatic flash device for a single lens reflex camera having an interchangeable lens, diaphragm control means including electrical means connectable to a photometric element which receives light passing through the full-opened diaphragm of the interchange lens, and means for correcting errors in the photometry corresponding to the open diaphragm value of the interchange lens, said automatic flash photographing device comprising:*

*information setting means for setting information for flash operation, connectable to the diaphragm control means,*

*a selector means for connecting the photometric element and the information setting means to the electrical means in correspondence to daylight photographing and flash photographing, and*

*a recorrecting means for recorrecting the previously made correction on the basis of the open diaphragm value of the interchangeable lens when the selector means is set for performing flash photography.*

*18. The device according to claim 17, wherein said setting means and recorrecting means form part of an attachment removably mounted on one end of the interchange lens.*

*19. For a single lens reflex camera with a body and one of a plurality of interchangeable lenses having a plurality of maximum apertures, a plurality of data entering means on at least one of said body and said lens, sensing means for sensing through the maximum aperture of the lens, operating means responsive to the maximum aperture of the lens and coupled to said sensing means for establishing at least an indication of the aperture to which the lens is to be set on the basis of said sensing means and varying it on the basis of the maximum aperture of the lens, a flash adjusting device, comprising:*

*setting means responsive to one of said entering means and coupleable to said operating means for constraining said operating means to establish an aperture;*

*switch means for disconnecting said sensing means from said operating means and connecting said setting means to said operating means;*

*said setting means including defeat means for defeating the variation in the aperture produced by said operating means in response to the changes in the maximum aperture of the lens.*

*20. An apparatus as in claim 19, wherein said defeat means includes a plurality of resistance means and means for varying the resistance on the basis of the maximum aperture of the lens.*

*21. An apparatus as in claim 19, wherein said operating means includes an ammeter, and said ammeter is rotated on the basis of the maximum aperture of the lens.*

*22. An apparatus as in claim 19, wherein said setting means includes an attachment removably mounted on one end of said interchangeable lens, said attachment including coupling means coupled to said entering means, and means for setting said defeat means to a particular setting corresponding to the maximum aperture to be defeated.*

*23. An apparatus as in claim 19, wherein said entering means is the focusing ring.*

*24. An apparatus for adjusting the operation of an interchangeable-lens focus-adjustable single-lens-reflex flash camera, comprising setting means for establishing an aperture value of the basis of flash information, connector means for entering the information, said setting means including varying means for varying the flash information on the basis of the maximum aperture of the interchangeable lens being used.*

*25. A camera comprising a body, one of a plurality of interchangeable lenses having one of a plurality of maximum apertures, a plurality of entering means for entering information into said camera, sensing means in the path of light from the lens for producing an output responding to light striking the sensing means, control means responsive to said sensing means for establishing a value corresponding to the desired ambient-light aperture of the lens, setting means coupled to one of said entering means for setting a value corresponding to a desired flas aperture, a switching means for disconnecting said sensing means for said control means and connecting said setting means to said control means, said setting means having variable defeat means settable to a plurality of positions corresponding to one of the plurality of maximum apertures for varying the set value on the basis of the maximum aperture of the lens.*

* * * * *